United States Patent
Stamey, Jr. et al.

(10) Patent No.: US 7,335,300 B1
(45) Date of Patent: Feb. 26, 2008

(54) FLUID FILTER ELEMENT

(75) Inventors: Willie L. Stamey, Jr., Kings Mountain, NC (US); Mark Allen Roll, Bessemer City, NC (US)

(73) Assignee: Wix Filtration Corp LLC, Gastonia, NC (US)

( * ) Notice: Subject to any disclaimer, the term of this patent is extended or adjusted under 35 U.S.C. 154(b) by 336 days.

(21) Appl. No.: 10/890,367

(22) Filed: Jul. 14, 2004

(51) Int. Cl.
*B01D 27/08* (2006.01)
*B01D 35/153* (2006.01)

(52) U.S. Cl. .................. 210/234; 210/441; 210/450; 210/457

(58) Field of Classification Search .............. 210/234, 210/235, 450, 232, 457, 458, 441
See application file for complete search history.

(56) References Cited

U.S. PATENT DOCUMENTS

| | | | |
|---|---|---|---|
| 4,735,716 A | 4/1988 | Petrucci et al. | |
| 4,751,901 A | 6/1988 | Moor | |
| 5,211,846 A * | 5/1993 | Kott et al. | 210/232 |
| 5,458,767 A | 10/1995 | Stone | |
| 5,527,463 A * | 6/1996 | Morgan, Jr. | 210/450 |
| 5,591,332 A | 1/1997 | Reid et al. | |
| 5,662,800 A | 9/1997 | Sugiura | |
| 5,665,230 A | 9/1997 | Bradford | |
| 5,733,443 A | 3/1998 | Stamey et al. | |
| 5,744,030 A | 4/1998 | Reid et al. | |
| 5,753,117 A | 5/1998 | Jiang | |
| 5,762,789 A | 6/1998 | de los Reyes et al. | |
| 5,770,065 A | 6/1998 | Popoff et al. | |
| 5,830,349 A * | 11/1998 | Roll et al. | 210/131 |
| 5,846,417 A | 12/1998 | Jiang et al. | |
| 5,855,780 A | 1/1999 | Dye et al. | |
| 5,858,227 A * | 1/1999 | Stone et al. | 210/234 |
| 5,908,553 A | 6/1999 | Reid | |
| 6,015,492 A | 1/2000 | Popoff et al. | |
| 6,053,334 A | 4/2000 | Popoff et al. | |
| 6,113,781 A | 9/2000 | Popoff et al. | |
| 6,171,491 B1 | 1/2001 | Popoff et al. | |
| 6,174,438 B1 | 1/2001 | Hodgkins et al. | |
| 6,270,660 B1 * | 8/2001 | Roll et al. | 210/131 |
| 6,274,038 B1 | 8/2001 | Reid | |

(Continued)

FOREIGN PATENT DOCUMENTS

DE     1 909 130     9/1970

(Continued)

*Primary Examiner*—Thomas M. Lithgow
(74) *Attorney, Agent, or Firm*—Honigman Miller Schwartz & Cohn LLP

(57) ABSTRACT

A filter element is removably positionable within a filter housing defining a filter chamber for said filter element. The filter housing comprises a standpipe extending within the filter chamber. The filter element includes a tubular filter media circumscribing the standpipe, a first end cap supporting the filter media at one end thereof, a second end cap longitudinally spaced from the first end cap and supporting the filter media at the opposite end thereof, and a center tube extending between the first and second end caps. The center tube has at least one inlet opening therethrough at a first end thereof adjacent to the first end cap and a standpipe opening therethrough at a second end thereof adjacent to the second end cap. The second end cap has at least one intake opening therethrough radially spaced from the standpipe opening in the center tube.

14 Claims, 7 Drawing Sheets

U.S. PATENT DOCUMENTS 6,607,665 B2    8/2003    Fick et al.

FOREIGN PATENT DOCUMENTS

| | | |
|---|---|---|
| DE | 1 915 923 | 10/1970 |
| EP | 0 426 064 B1 | 5/1991 |
| EP | 0 483 119 A2 | 4/1992 |
| EP | 0 532 161 B1 | 3/1993 |
| FR | 686 520 | 7/1930 |
| JP | 52-50364 | 4/1977 |
| JP | 54-37966 | 3/1979 |
| JP | 61-53564 | 3/1986 |
| JP | 63-7285 | 1/1988 |
| JP | 5-23506 | 2/1993 |
| WO | WO 95/00232 | 1/1995 |
| WO | WO 95/07745 | 3/1995 |
| WO | WO 95/13468 | 5/1995 |
| WO | 02/078816 | * 10/2002 |

* cited by examiner

FLUID FILTER ELEMENT

BACKGROUND OF THE INVENTION

1. Field of the Invention

This invention relates to fluid filter assemblies in general, and, more particularly, to a fluid filter assembly including a replaceable, fluid filter element that actuates a flow control valve in a standpipe of a filter housing.

2. Description of the Prior Art

Many types of fuel filters are known in the prior art. A popular type of fuel filter construction is one that has a housing which encloses a replaceable filter element. Fuel used to power a self-propelled vehicle, such as gasoline or diesel fuel, is cleansed of impurities as it passes through filter media of the filter element. The filter media captures many of the impurities that are removed from the fuel. Other impurities collect on the surface of the media and fall downward into a bottom area of the filter housing from which they may be periodically removed through a drain valve.

Periodically the filter element must be replaced. Such periodic replacement ensures that the filter element will not become so loaded with impurities that fuel flow is restricted. Replacing the element also ensures that impurities are removed from fuel before it is delivered to other fuel system components such as fuel injection pumps and fuel injectors, where such contaminants may cause severe damage.

Changing filter elements may pose problems however. One common problem is that disturbance of the spent element during replacement may cause collected impurities to fall off the element. In some designs, these impurities may travel into the outlet of the filter housing. As a result these contaminants may reach the components downstream in the fuel system. Another problem with certain prior art fuel filter constructions is that changing the element may require a mechanic to have skin contact-with the fuel. It is desirable to minimize such contact when changing a filter element.

While known liquid filters have proven to be acceptable for various vehicular applications, such devices are nevertheless susceptible to improvements that may enhance their performance and cost. With this in mind, a need exists to develop improved fluid filter assembly that advance the art.

SUMMARY OF THE INVENTION

The present invention provides a new and improved fluid filter assembly providing an inside-out flow pattern. Alternatively, the fluid filter assembly of the present invention may provide an outside-in flow pattern.

The fluid filter assembly in accordance with the present invention comprises a filter housing having a central axis and defining a filter chamber, a standpipe extending upwardly substantially coaxially to the central axis of the filter housing into the filter chamber so as to define an internal flow passage, and a filter element removably positionable within the filter chamber of the filter housing. The filter element of the present invention comprises a tubular filter media circumscribing the central axis, a first end cap supporting the filter media at one end thereof, a second end cap longitudinally spaced from the first end cap and supporting the filter media at the opposite end thereof, and a center tube extending between the first and second end caps.

The center tube is disposed about the standpipe substantially coaxially with the central axis so as to define an exit compartment between the center tube and the standpipe. The center tube has at least one inlet opening therethrough at a first end thereof adjacent to the first end cap for providing fluid communication between said filter chamber and said exit compartment. The center tube further has a standpipe opening therethrough at a second end thereof adjacent to the second end cap and through which the standpipe being inserted longitudinally into the center tube. In turn, the second end cap has at least one intake opening therethrough radially spaced from the standpipe opening in the center tube for providing fluid communication between the filter chamber and a volume inside the filter element between the filter media and the center tube. Preferably, the center tube is homogenously formed integrally with the second end cap as a single piece unitary member.

Accordance to the preferred embodiment of the present invention, the standpipe is provided with a flow control valve for selectively controlling fluid flow through the standpipe. The flow control valve is normally in a closed position preventing flow through the internal flow passage. The flow control valve is accessible from a distal end of the standpipe and moveable into an open position allowing flow through the internal flow passage.

Upon further study of the specification and appended claims, further features and advantages of this invention will become apparent to those skilled in the art.

BRIEF DESCRIPTION OF THE DRAWINGS

Other objects and advantages of the invention will become apparent from a study of the following specification when viewed in light of the accompanying drawings, wherein.

DETAILED DESCRIPTION OF PREFERRED EMBODIMENTS

The preferred embodiment of the present invention will now be described with the reference to accompanying drawings. For purposes of the following description, the terms "upper", "lower", "top", "bottom", "upward", "downward", "vertical", "horizontal" and derivatives of such terms shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts. Specific dimensions and other physical characteristics relating to the embodiments disclosed herein are not to be considered as limiting, unless expressly stated otherwise.

Figure 1:
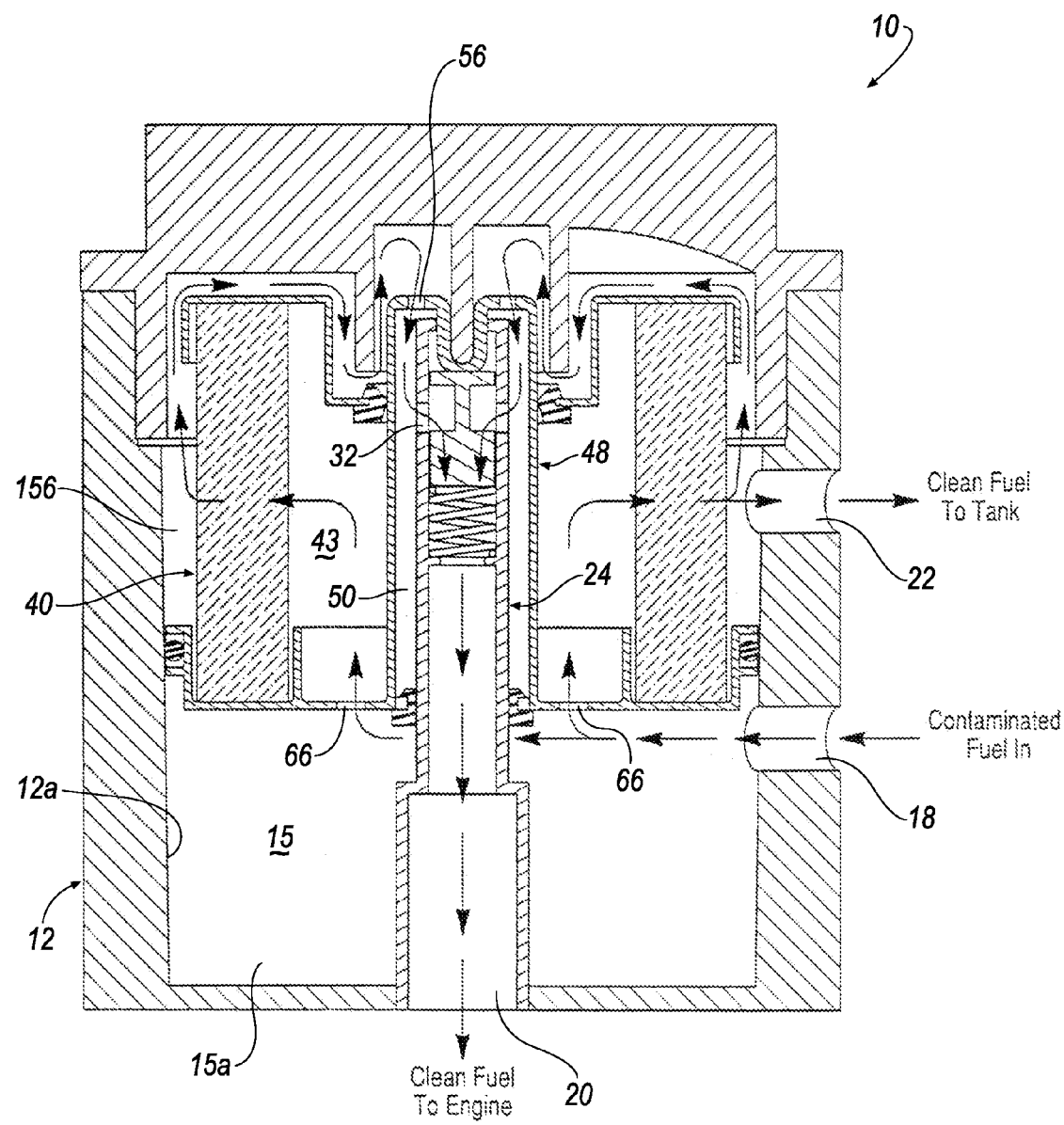
FIG. 1 is a cross-sectional view of a fuel filter assembly in accordance with the preferred embodiment of the present invention.

FIG. 1 depicts a fluid filter assembly 10 in accordance with the preferred embodiment of the present invention providing an inside-out flow pattern. It will be appreciated that in other embodiments of the invention an outside-in flow pattern may be used. The fluid filter assembly 10 comprises a filter housing 12 and a replaceable (or disposable) filter element 40 removably mounted within the filter housing 12, the combination of which provides the filter assembly 10. Preferably, the filter assembly 10 is provided for filtering particulate impurities from liquid fuels such as gasoline or diesel. It will be appreciated that the filter assembly 10 of the present invention may be used for filtering any appropriate fluid.

Figure 2:
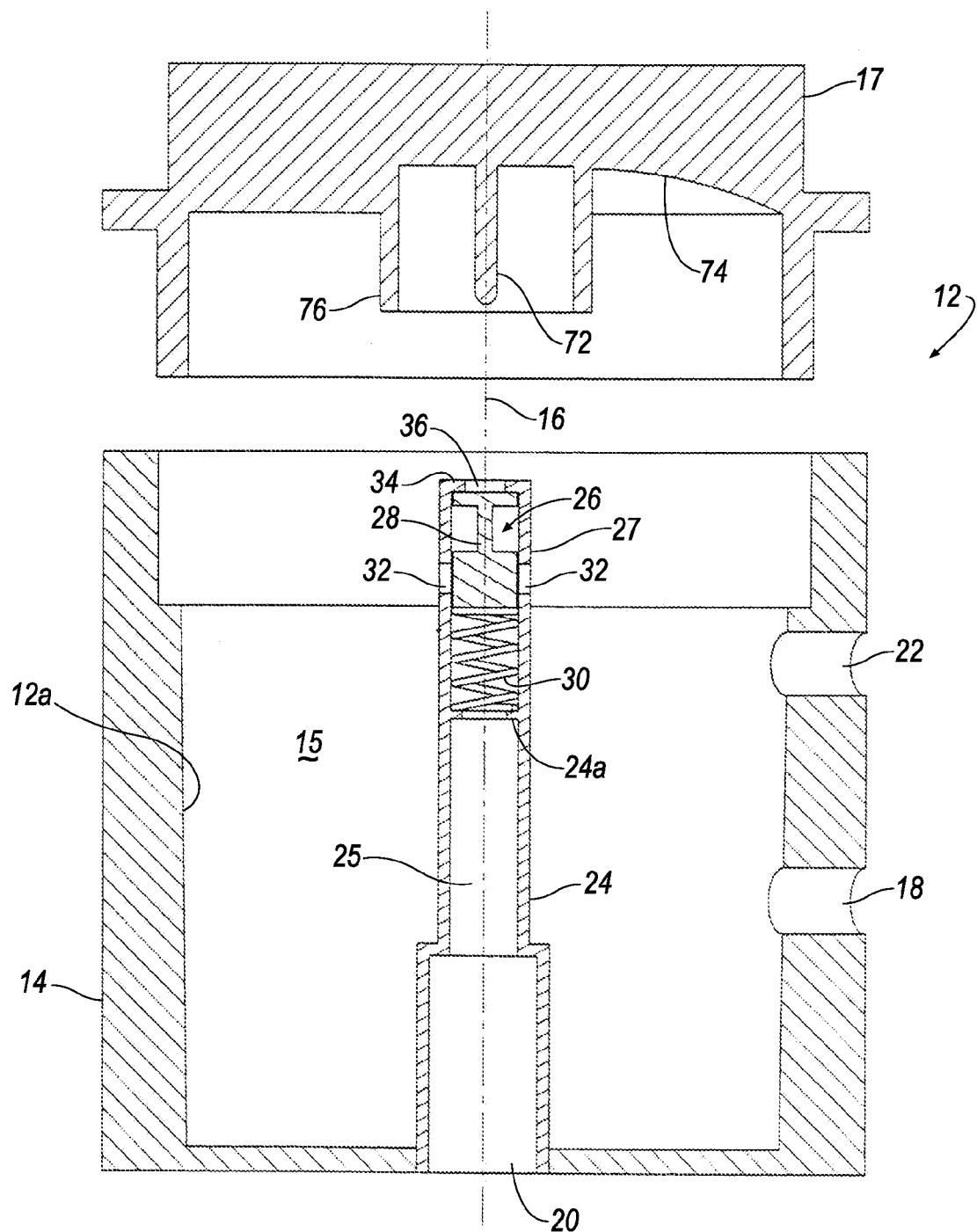
FIG. 2 is a cross-sectional view of a filter housing in accordance with the preferred embodiment of the present invention.

The filter housing 12, further illustrated in detail in FIG. 2, is rather conventional and includes a cup-shaped bowl 14 having a central axis 16 and a opening at its top, and a cover 17 removably attached to the bowl 14. Preferably, the cover 17 is threadedly attached to the bowl 14. The filter housing 12 defines a filter chamber 15 into which the filter element 40 is mounted.

The filter housing 12 is adapted to be connected to a fuel system of an internal combustion engine (not shown) for receiving unfiltered fuel via a fuel inlet port 18 and returning filtered fuel for combustion via a fuel outlet port 20. Portion of the filtered fuel returns to a fuel tank (not shown) via a return port 22.

A standpipe 24 extends vertically upward substantially coaxially to the central axis 16 of the bowl 14. The standpipe 24 includes an internal flow passage 25 in fluid communication with the outlet port 20 and a flow control valve 26 adjacent to a distal end of the standpipe 24. The flow control valve 26 is provided for opening and closing the filter chamber 15 of the filter housing 12 to the outlet port 20 depending upon whether or not the filter element 40 has been properly mounted to the filter housing 12. The standpipe 24 includes a cylindrical wall 27 which has a cylindrical interior surface adjacent its upper end. A pair of radially extending port openings 32 extend through the wall 31 of the standpipe 24.

Figure 3:
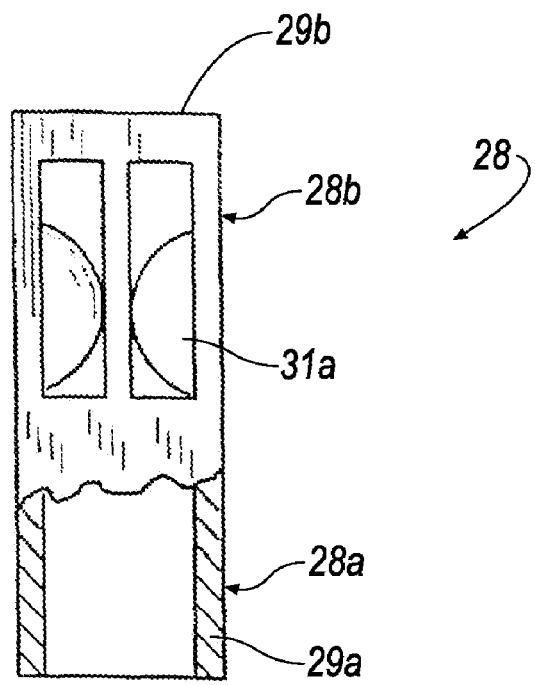
FIG. 3 is a is a partially sectioned side view of a closure element of a flow control valve according to the exemplary embodiment of the present invention in an open position.
Figure 4:
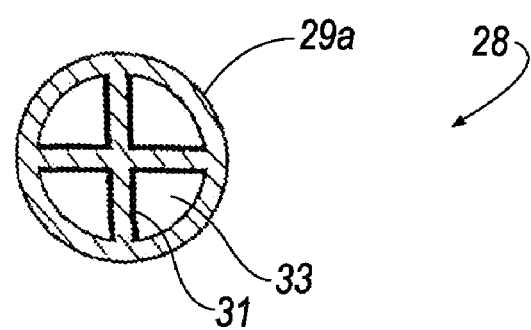
FIG. 4 is a bottom view of the closure element of the flow control valve according to the exemplary embodiment of the present invention in an open position.

The valve 26 includes a closure element 28 mounted for longitudinal movement within the cylindrical wall 27 of the standpipe 24 and biased by a spring 30 to a closed position for preventing fuel flow into the standpipe 24 through the port openings 32. As illustrated in detail in FIGS. 3 and 4, the closure element 28 has a lower cylindrical portion 28a bounded by a cylindrical element wall 29a, and a head portion 28b which has a flat, solid, top portion 29b. The closure element 28 further includes cross members 31 that bound flow cavities 33. The cross members 31 extend through the element to top portion 29b. The element wall 29a terminates at the head portion 29b, however, and enables fluid access to the flow cavities 33 between the cross members 31. The cross members 31 also include cut-outs 31a in the head portion 28b to facilitate fluid flow into the flow cavities 33.

The closure element 28 is sized so that the cylindrical wall 29a and the top portion 29b are in close-fitting, movable relation with the interior surface of the cylindrical wall 27 of the standpipe 24. The closure element 28 is thereby made longitudinally movable inside the cylindrical wall 27 of the standpipe 24. The spring 30 mounted in the standpipe 24 serves as biasing means for biasing the closure element 28 in the outward direction toward a top end 34 of the standpipe 24. The standpipe 24 has an annular shelf 24a against which one end of the coil spring 30 bears, the other end of the coil spring bearing against the lower cylindrical portion 28a of the closure element 28 to hold the flow control valve 26 in closed position.

The closure element 28, the standpipe 24 and the port openings 32 therein operate together as the flow control valve 26 to control fluid communication between the filter chamber 15 inside the housing 12 and the internal flow passage 25 of the standpipe 24. When the head portion 28b of the closure element 28 is adjacent the port openings 32 of the standpipe 24 as shown in FIG. 1, the port openings 32, which enable the fluid to be admitted to the internal flow passage 25 of the standpipe 24, are open. Fuel flows into the internal flow passage 25 of the standpipe 24 and passes through flow cavities 33 in the closure element 28, and eventually passes to the fuel outlet port 20 of the filter assembly 10. However, when the closure element 28 is disposed upward from the position shown in FIG. 1 to the position shown in FIG. 2, the cylindrical portion 28b of the closure element 28 is disposed with its cylindrical element wall 29a adjacent and in blocking relation to the port openings 32. As a result, the fluid flow into the standpipe 24 is blocked.

The standpipe 24 also includes an actuator opening 36 at its top end 34 for receiving an actuator pin of the filter element 40 that axially depresses the closure element 28 against the bias of the spring 30 to allow fuel flow through the port openings 32 past the closure element 28 and to the fuel outlet port 20.

The replaceable filter element 40 is removably mounted in the filter chamber 15 of the filter housing 12. The filter element 40 illustrated in detail in FIGS. 3-6, includes a ring of a continuous, tubular filter media 42 in generally surrounding relation of the standpipe 24 so as to circumscribe the central axis 16. The filter media 42 may be one of several types of filter media material known in the art and adapted for removing impurities from fluid that passes therethrough.

The filter element 40 further includes a first (upper) end cap 44 at its upper end, and a second (lower) end cap 46 at its lower end. The end caps 44 and 46 are engaging and supporting in fluid tight relation the ring of filter media 42 at the opposite ends thereof in a conventional manner using potting compound or similar adhesive material. The filter element 40 further includes a center tube 48 having a substantially cylindrical side wall 49 extending vertically upward between the second end cap 46 and the first end cap 44. As illustrated in FIG. 1, the center tube 48 is disposed about the standpipe 24 substantially coaxially to the central axis 16 so that the cylindrical side wall 49 of the center tube 48 is radially spaced from the standpipe 24 to form a substantially cylindrical exit compartment 50 between the center tube 48 and the standpipe 24. Preferably, the center tube 48 is homogenously formed integrally with the second end cap 46 as a single piece unitary member. Alternatively, the center tube 48 is secured to the second end cap 46 by any appropriate manner known in the art, such as adhesive bonding, welding, etc.

Figure 5:
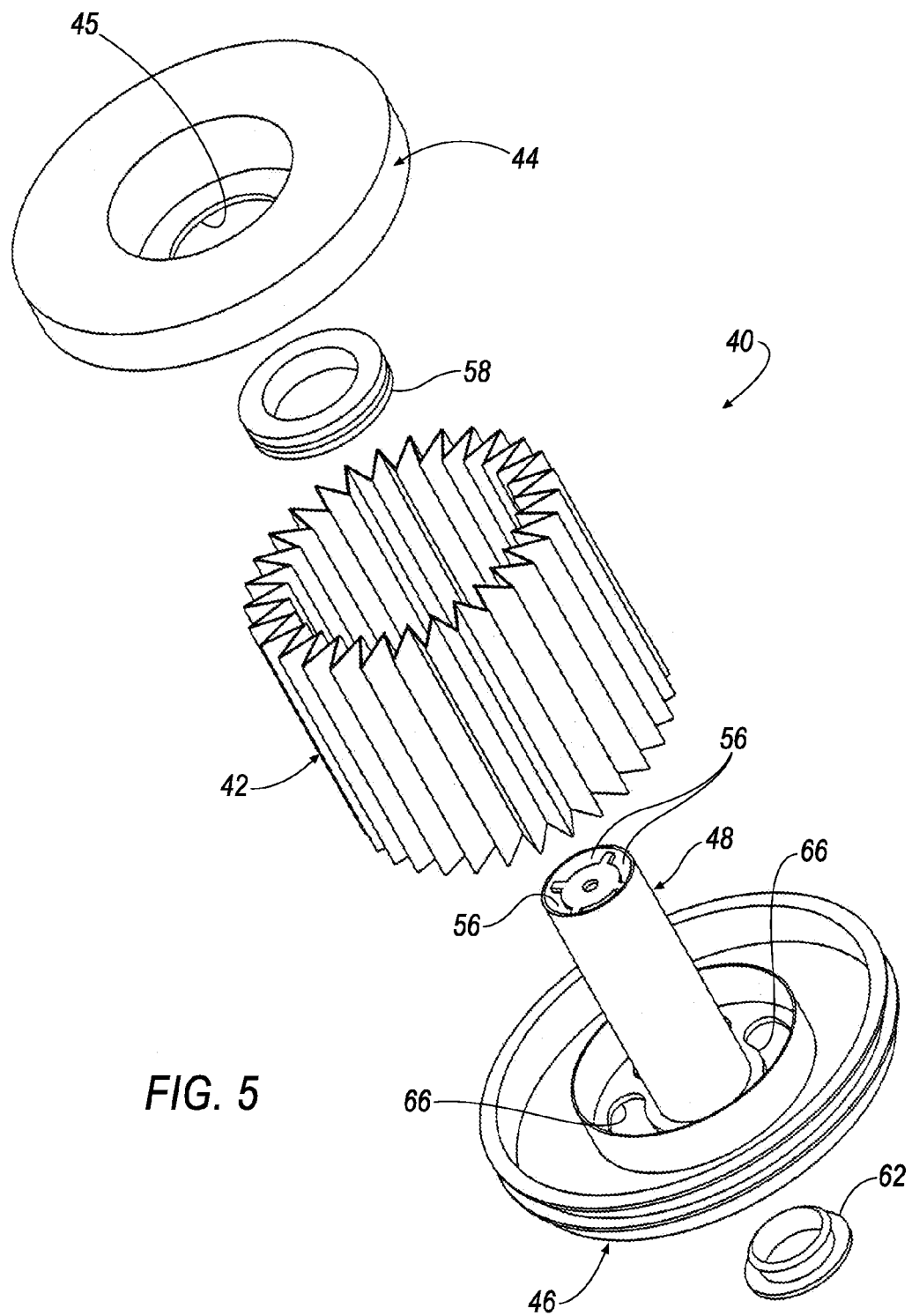
FIG. 5 is an exploded perspective view of a filter element in accordance with the preferred embodiment of the present invention.
Figure 6:
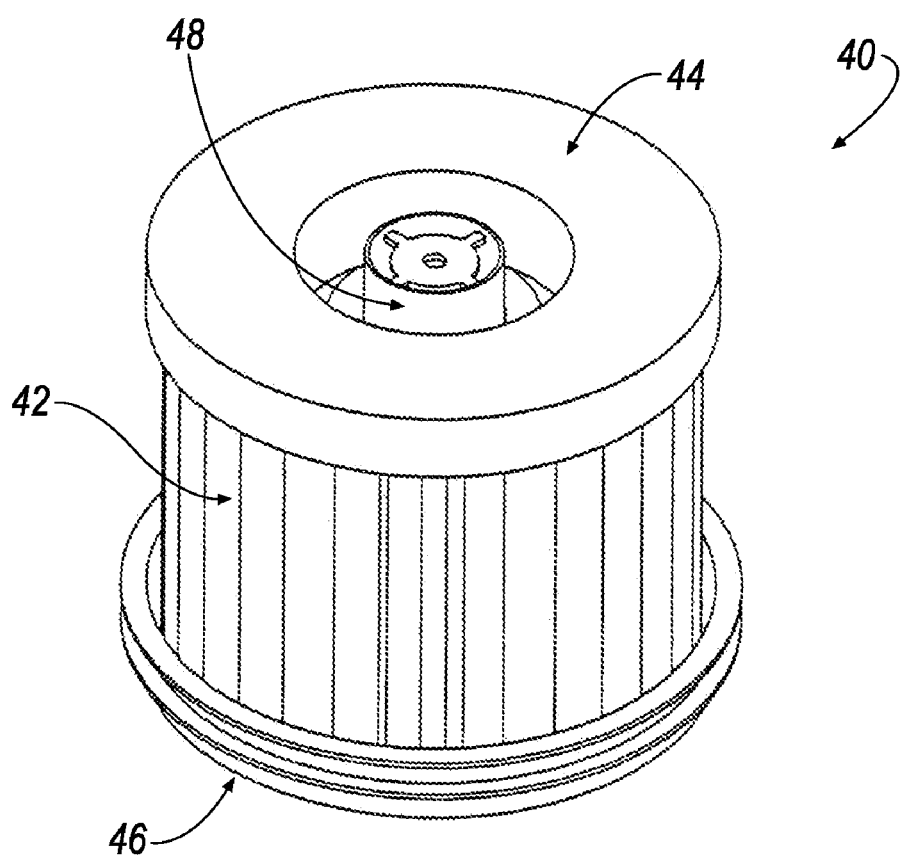
FIG. 6 is a perspective view of the filter element in accordance with the preferred embodiment of the present invention.
Figure 9:
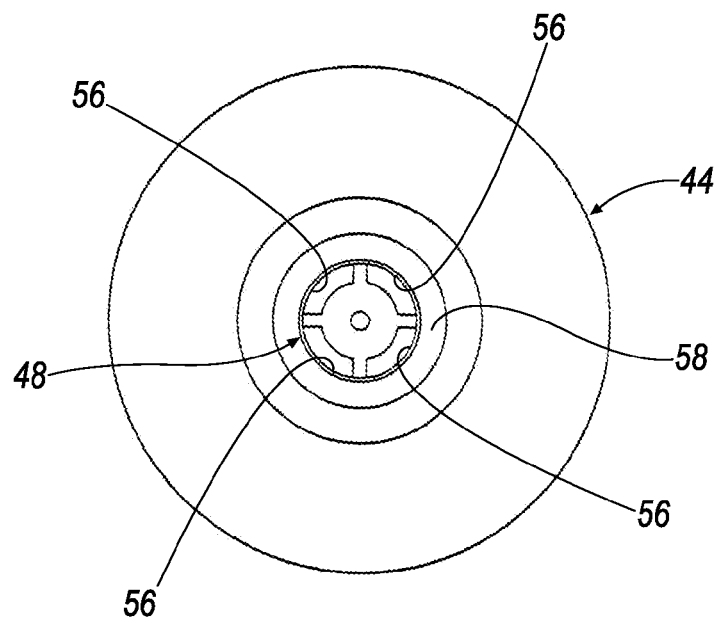
FIG. 9 is a top view of the filter element in accordance with the preferred embodiment of the present invention.

The center tube 48 has a first end 52 adjacent to the first end cap 44 and a second end 54 adjacent to the second end cap 46 of the filter element 40. The first end 52 of the center tube 48 is provided with at least one inlet (or first) opening 56 therethrough. Preferably, as illustrated in FIGS. 5, 6 and 9, the center tube 48 is provided with four inlet openings 56. It will be appreciated that more or less inlet openings 56 may be employed depending upon the relative dimensions and proportions of the particular design of the filter assembly 10. Moreover, the first end 52 of the center tube 48 is provided with an actuator pin 57 that extends through the actuator opening 36 at the top end 34 of the standpipe 24 and axially depresses the closure element 28 against the bias of the spring 30 to allow fuel flow through the port openings 32 past the closure element 28 and to the fuel outlet port 20.

The first end cap 44 is provided with a central hole 45 adapted to receive the first end 50 of the center tube 48 therethrough. An annular seal, or grommet, 58 extends across the central hole 45 in the first end cap 44 to an outer peripheral surface of the center tube 48 to seal a volume 43 inside the filter element 40 between the filter media 42 and the center tube 48 against infiltration of contaminated fuel, as illustrated in FIG. 1. Furthermore, the first end cap 44 has a substantially cylindrical flange portion 45 radially spaced from an inner peripheral surface 12a of the filter housing 12.

Figure 7:
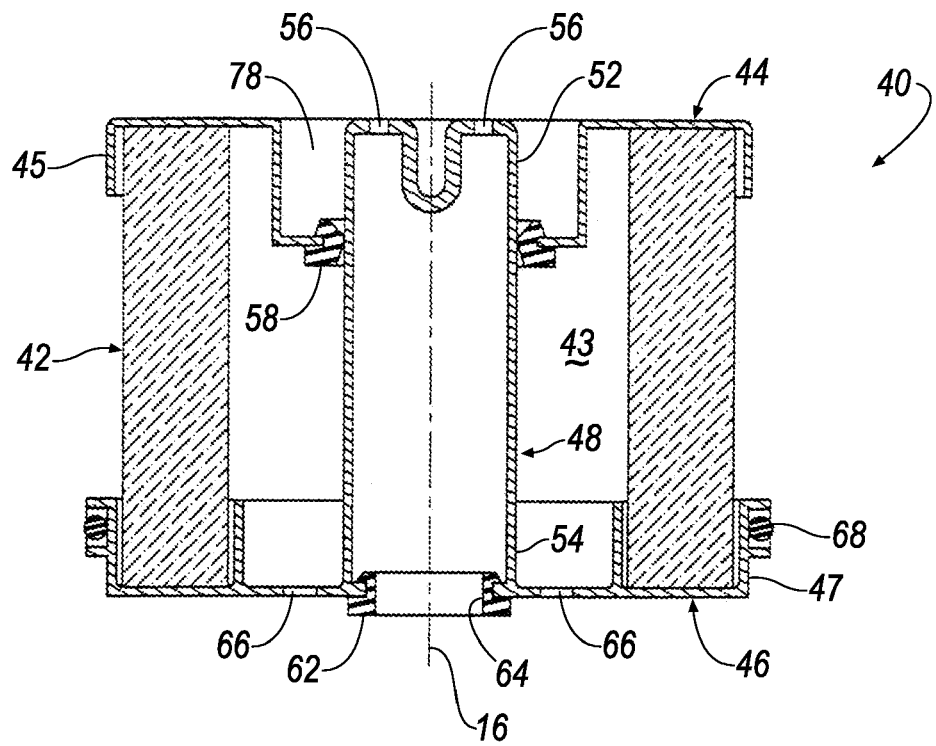
FIG. 7 is a cross-sectional view of the filter element in accordance with the preferred embodiment of the present invention.

The center tube 48 further has a standpipe opening 60 therethrough at the second end 54 thereof adjacent to the second end cap 46 (see FIG. 8) and through which the standpipe 24 can be inserted longitudinally into the center tube 48. An annular, resilient seal, or grommet, 62 extends across the opening 60 to an outer peripheral surface of the standpipe 24 to seal the exit compartment 50 between the center tube 48 and the standpipe 24 against infiltration of contaminated fuel, as illustrated in FIGS. 1 and 7. The annular seal 62 defines a central opening 64 which accepts the standpipe 24 in the center tube 48.

Figure 10:
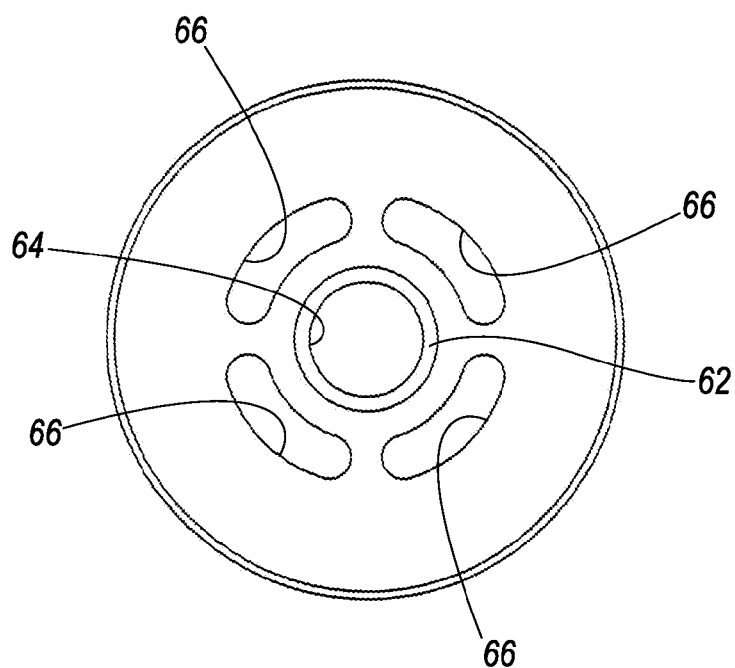
FIG. 10 is a bottom view of the filter element in accordance with the preferred embodiment of the present invention.

The second end cap 46 of the filter element 40 is provided with at least one intake (or second) opening 66 therethrough radially spaced the standpipe opening in the center tube 48. Preferably, as illustrated in FIG. 10, the second end cap 46 is provided with four intake openings 66 spaced apart circumferentially around the central opening 64. It will be appreciated that more or less intake openings 66 may be employed depending on the relative dimensions and proportions of the particular design of the filter assembly 10.

Figure 8:
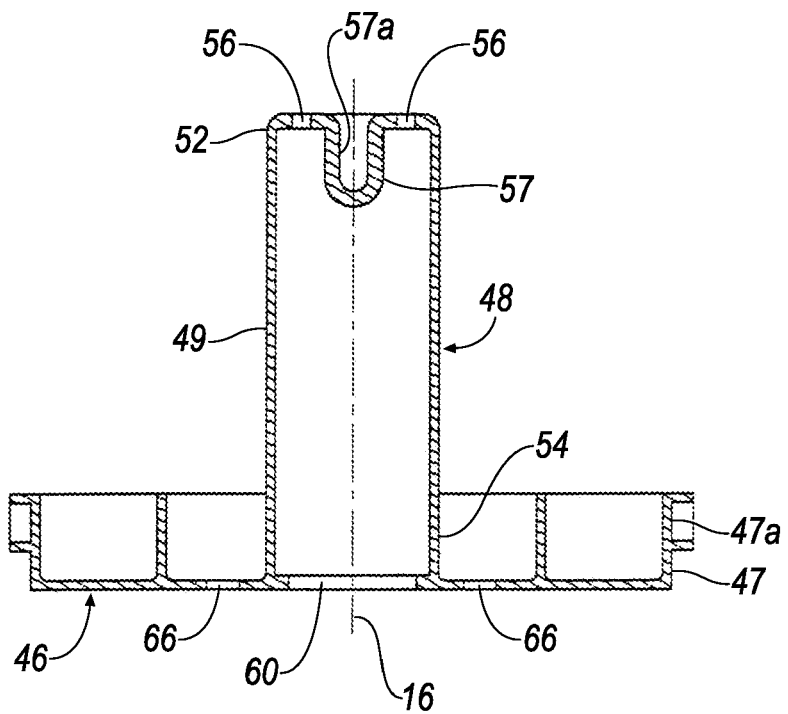
FIG. 8 is a cross-sectional view of a first end cap of the filter element in accordance with the preferred embodiment of the present invention formed integrally with a center tube.

As further illustrated in FIGS. 1, 7 and 8, the second end cap 46 has a substantially cylindrical flange portion 47. The flange portion 47 of the second end cap 46 includes a gasket receiving groove 47a in which an O-ring seal 68 is positioned for sealing the second end cap 46 against the inner peripheral surface 12a of the filter housing 12. Such an arrangement of the O-ring seal 68 separates the filter chamber 15 of the filter housing 12 into a contaminated, or unfiltered, fuel chamber 15a and a clean, or filtered, fuel chamber 15b. Therefore, the second end cap 46 of the filter element 40 sealingly engages the inner peripheral surface 12a of the filter housing 12 through the O-ring seal 68 to prevent unfiltered, contaminated fuel flow to enter the clean fuel chamber 15b.

The cover 17 has a cover projection 72 is positioned centrally on an interior cover top wall 74 of the cover 17 (see FIG. 2). The cover projection 72 is adapted to be accepted into a recess 57a formed in the actuator pin 57 of the center tube 48 and serves as support means for supporting the actuator pin 57. While the cover projection 72 is adapted for adding strength to the actuator pin 57, it is of insufficient length to engage the closure element 28 of the flow control valve 26. The cover 17 also includes a circular centering wall 76 which extends in surrounding relation to the cover projection 72. The centering wall 76 is sized to be accepted into a well area 78 on the first end cap 44 (see FIGS. 1 and 7).

In operation of the filter assembly 10 as illustrated in FIG. 1, the unfiltered (contaminated) fuel flows into the contaminated fuel chamber 15a of the filter housing 12 through the inlet port 18. The unfiltered fuel then passes through the intake openings 66 in the second end cap 46 of the filter element 40 and enters the volume 43 inside the filter element 40 between the filter media 42 and the center tube 48. Subsequently, the unfiltered fuel passes the filter media 42 of the filter element 40 in the inside-out flow pattern into the clean fuel chamber 15b and is cleansed of impurities. The clean fuel travels from the clean fuel chamber 15b through the space between the flange portion 45 of the first end cap 44 and the inner peripheral surface 12a of the filter housing 12 and passes through the inlet openings 56 in the center tube 48 of the filter element 40 into the exit compartment 50 between the center tube 48 and the standpipe 24. The fuel then passes through the port openings 32 in the standpipe 24 and the flow cavities 33 of the closure element 28 of the flow control valve 26 into the internal flow passage 25 of the standpipe 24 and leaves the filter housing through the outlet port 20 provided at a proximal end of the standpipe 24. Portion of the filtered fuel returns to the fuel tank (not shown) via the return port 22.

Changing of the filter element 40 is accomplished by removing the cover 17 and causing the filter element 40 to move upward by the resilient force of the spring 30. As the end cap 46 of the filter element 40 moves upward with the cover 17, the closure element 28 of the flow control valve 26 also moves upward, so that its cylindrical lower portion 28a is in blocking relation with the port openings 32. Further outward movement of flow element 42 is prevented by its engagement with guide ring 40.

A new filter element 40 is installed in the bowl 14 by inserting the standpipe 24 into the central opening 64 in the center tube 48. The filter element 40 is then moved downward. As this is done, the seal 62 on the lower end cap 46 wipes away impurities from the standpipe 24 and keeps dirty fuel away from the exit compartment 50 between the center tube 48 and the standpipe 24. Further movement of the filter element 40 into the filter chamber 15 causes the actuator pin 57 of the center tube 48 to enter the actuator opening 36 in the standpipe 24. The actuator pin 57 engages and moves the closure element 28 of the flow control valve 26 downward to again open the port openings 32, as shown in FIG. 1. The cover 17 is then secured to the bowl 14 of the filter housing 12. In this position, the actuator pin 57 is reinforced by the cover projection 72 providing sufficient strength to move the closure element 28 against the biasing force of the spring 30.

The foregoing description of the preferred embodiment of the present invention has been presented for the purpose of illustration in accordance with the provisions of the Patent Statutes. It is not intended to be exhaustive or to limit the invention to the precise forms disclosed. Obvious modifications or variations are possible in light of the above teachings. The embodiments disclosed hereinabove were chosen in order to best illustrate the principles of the present invention and its practical application to thereby enable those of ordinary skill in the art to best utilize the invention in various embodiments and with various modifications as are suited to the particular use contemplated, as long as the principles described herein are followed. Thus, changes can be made in the above-described invention without departing from the intent and scope thereof. It is also intended that the scope of the present invention be defined by the claims appended thereto.

What is claimed is:

1. A fluid filter assembly comprising:
a filter housing having a central axis and defining a filter chamber;
a standpipe extending upwardly substantially coaxially to the central axis of said filter housing into said filter chamber;
said standpipe including an internal flow passage; and
a filter element removably positionable within said filter chamber of said filter housing, said filter element comprising:
a tubular filter media circumscribing the central axis;
a first end cap supporting said filter media at one end thereof;
a second end cap longitudinally spaced from said first end cap and supporting said filter media at the opposite end thereof; and
a center tube extending between said second end cap and said first end cap, said center tube disposed about said standpipe substantially coaxially with the central axis so as to define an exit compartment between said center tube and said standpipe;
said center tube having at least one inlet opening therethrough at a first end thereof adjacent to said first end cap for providing fluid communication between said filter chamber and said exit compartment;
said center tube further having a standpipe opening therethrough at a second end thereof adjacent to said second end cap and through which said standpipe being inserted longitudinally into said center tube;
said second end cap having at least one intake opening therethrough radially spaced from said standpipe opening in said center tube for providing fluid communication between said filter chamber and a volume inside said filter element between said filter media and said center tube.

2. The fluid filter assembly as defined in claim 1, wherein said filter housing includes a cylindrical cup-shaped bowl having a closed end and an opposite open end and a cover removably attached to said open end of said bowl.

3. The fluid filter assembly as defined in claim 1, wherein said standpipe is provided with a flow control valve for selectively controlling fluid flow through said standpipe.

4. The fluid filter assembly as defined in claim 3, wherein said flow control valve is normally is a closed position preventing flow through said internal flow passage, said flow control valve is accessible from a distal end of said standpipe and movable into an open position allowing flow through said internal flow passage.

5. The fluid filter assembly as defined in claim 1, wherein said filter housing is provided with an inlet port in fluid communication with said filter chamber and an outlet port in fluid communication with said internal flow passage of said standpipe.

6. The fluid filter assembly as defined in claim 1, wherein said second end cap of said filter element sealingly engages an inner peripheral surface of said filter housing so as to separate said filter chamber of the filter housing into a contaminated fuel chamber and a clean fuel chamber.

7. The fluid filter assembly as defined in claim 6, wherein said at least one inlet opening in said center tube provides fluid communication between said clean fuel chamber and said exit compartment, and said at least one intake opening in said second end cap provides fluid communication between said contaminated fuel chamber and said volume inside said filter element.

8. The fluid filter assembly as defined in claim 6, wherein said filter housing is further provided with a return port in fluid communication with said clean fuel chamber.

9. A component of a filter element having filter media, comprising:
a center tube, wherein the center tube is defined by
a first end including
at least one fluid inlet opening, and
a second end including
a standpipe opening, and
at least one second opening that is radially spaced from said standpipe opening; and
a first end cap that radially extends from and is integrally formed with a cylindrical sidewall of the center tube, wherein the at least one second opening is formed in the first end cap, wherein the first end cap includes an axial flange portion, wherein the axial flange portion include a radial gasket-receiving groove.

10. The component of a filter element having filter media as defined in claim 9, further comprising:
a second end cap, wherein the second end cap is removably-secured to the cylindrical sidewall of the center tube, wherein said center tube is substantially axially aligned with a central axis, wherein said center tube extends between said first and second end caps.

11. The component of a filter element having filter media as defined in claim 10, wherein said at least one fluid inlet opening is formed in the center tube and proximate the second end cap, wherein the cylindrical sidewall of the center tube extends through an opening defined by the second end cap.

12. The component of a filter element having filter media as defined in claim 10, further comprising:
a first seal disposed in said radial gasket-receiving groove;
a second seal that radially seals said first end of the center tube proximate the first end cap; and
a third seal that radially seals said second end of the center tube proximate the second end cap.

13. The component of a filter element having filter media as defined in claim 10, wherein said second end cap includes at least one fluid intake opening, wherein the at least one fluid intake opening is radially spaced from said standpipe opening.

14. The component of a filter element having filter media as defined in claim 9, wherein the first end of the center tube is further defined by an axial recess for receiving a projection extending from a cover member.

* * * * *